United States Patent
So et al.

(10) Patent No.: US 8,856,427 B2
(45) Date of Patent: Oct. 7, 2014

(54) MEMORY CONTROLLER AND NON-VOLATILE STORAGE DEVICE

(75) Inventors: Hirokazu So, Kyoto (JP); Toshiyuki Honda, Kyoto (JP)

(73) Assignee: Panasonic Corporation, Osaka (JP)

( * ) Notice: Subject to any disclaimer, the term of this patent is extended or adjusted under 35 U.S.C. 154(b) by 52 days.

(21) Appl. No.: 13/435,493

(22) Filed: Mar. 30, 2012

(65) Prior Publication Data

US 2012/0317340 A1    Dec. 13, 2012

(30) Foreign Application Priority Data

Jun. 8, 2011 (JP) ................................. 2011-127886
Feb. 29, 2012 (JP) ................................. 2012-043489

(51) Int. Cl.
G06F 12/02       (2006.01)
G06F 11/10       (2006.01)

(52) U.S. Cl.
CPC ................................. G06F 11/1068 (2013.01)
USPC .......................................... 711/103; 714/763

(58) Field of Classification Search
USPC .................................................. 711/103, 193
See application file for complete search history.

(56) References Cited

U.S. PATENT DOCUMENTS

| | | | |
|---|---|---|---|
| 5,956,743 A * | 9/1999 | Bruce et al. .................... | 711/103 |
| 6,230,240 B1 | 5/2001 | Shrader et al. | |
| 6,397,293 B2 | 5/2002 | Shrader et al. | |
| 7,076,606 B2 | 7/2006 | Orsley | |
| 7,136,578 B2 * | 11/2006 | Ito et al. ........................ | 386/264 |
| 7,173,852 B2 * | 2/2007 | Gorobets et al. ......... | 365/185.09 |
| 7,475,184 B2 * | 1/2009 | Lee ................................ | 711/103 |
| 8,117,517 B2 | 2/2012 | Kanno et al. | |
| 8,307,149 B2 | 11/2012 | Honda et al. | |
| 2001/0001871 A1 | 5/2001 | Shrader et al. | |
| 2002/0016944 A1 * | 2/2002 | Yoshida et al. ................ | 714/758 |
| 2004/0059869 A1 | 3/2004 | Orsley | |
| 2006/0206665 A1 | 9/2006 | Orsley | |
| 2008/0301256 A1 * | 12/2008 | McWilliams et al. ......... | 709/214 |
| 2009/0049229 A1 * | 2/2009 | Honda et al. .................. | 711/101 |
| 2009/0183052 A1 | 7/2009 | Kanno et al. | |
| 2009/0307414 A1 | 12/2009 | Sukegawa et al. | |
| 2009/0327803 A1 | 12/2009 | Fukutomi et al. | |
| 2010/0049904 A1 * | 2/2010 | Chen ............................. | 711/103 |
| 2011/0239088 A1 * | 9/2011 | Post .............................. | 714/763 |

FOREIGN PATENT DOCUMENTS

| | | |
|---|---|---|
| JP | 6-187249 | 7/1994 |
| JP | 2000-56931 | 2/2000 |
| JP | 2004-118837 | 4/2004 |
| JP | 2005-292925 | 10/2005 |
| JP | 2009-59422 | 3/2009 |

(Continued)

*Primary Examiner* — April Y Blair
*Assistant Examiner* — Trang Ta
(74) *Attorney, Agent, or Firm* — Wenderoth, Lind & Ponack, L.L.P.

(57) ABSTRACT

A non-volatile storage device comprises non-volatile memories for storing data; and a memory controller for carrying out control of the non-volatile memory. The memory controller stores second error correcting code as well as first error correcting code stored in the same page of the data. The memory controller, when writing data smaller than a predefined size, does not add the second error correcting code, and stores duplexed data of the data and the first correcting code in a different page. The memory controller, when reading, corrects data using the first and/or second correcting code. The valid data management table manages which logical block stores valid data with respect to an identical logical address.

14 Claims, 13 Drawing Sheets

(56) References Cited

FOREIGN PATENT DOCUMENTS

| | | |
|---|---|---|
| JP | 2009-124276 | 6/2009 |
| JP | 2009-294869 | 12/2009 |
| JP | 2010-15195 | 1/2010 |
| WO | 2007/066720 | 6/2007 |

\* cited by examiner

Fig.5

| | ADDRESS OF LOGICAL BLOCK | ADDRESS OF PHYSICAL BLOCK |
|---|---|---|
| FIRST DATA RECORDING REGION | 0×0000 | 0×00010 |
| | | 0×10010 |
| | | 0×20010 |
| | | 0×30010 |
| | | 0×40010 |
| | 0×0001 | 0×00025 |
| | | 0×10025 |
| | | 0×20025 |
| | | 0×30025 |
| | | 0×40025 |
| | ⋮ | ⋮ |
| SECOND DATA RECORDING REGION | 0×F0000 | 0×00100 |
| | | 0×10100 |
| | | 0×20100 |
| | | 0×30100 |
| | | 0×40100 |
| | ⋮ | ⋮ |
| | ⋮ | ⋮ |

COINCIDING WITH LOGICAL ADDRESS SPACE OF ACCESS DEVICE (First Data Recording Region)

VIRTUAL LOGICAL ADDRESS SPACE (Second Data Recording Region and below)

Fig.6

| (VIRTUAL LOGICAL ADDRESS SPACE) ADDRESS OF LOGICAL BLOCK | (LOGICAL ADDRESS APACE OF ACCESS DEVICE) LOGICAL ADDRESS OF DATA | PHYSICAL ADDRESS OF DATA | PHYSICAL ADDRESS OF COPY OF DATA |
|---|---|---|---|
| 0×F000 | LOGICAL BLOCK 0×0001 LOGICAL PAGE 0×09A | LOGICAL BLOCK 0×00100 LOGICAL PAGE 0×000 | LOGICAL BLOCK 0×00101 LOGICAL PAGE 0×000 |
| ⋮ | ⋮ | ⋮ | ⋮ |

MEMORY CONTROLLER AND NON-VOLATILE STORAGE DEVICE

BACKGROUND

1. Technical Field

The present invention relates to a memory controller for controlling a non-volatile memory, and a non-volatile storage device such as a semiconductor memory card including the non-volatile memory and the memory controller.

2. Related Art

In recent years, a demand for a non-volatile storage device including a rewritable non-volatile memory is increasing, centering on a semiconductor memory card.

The semiconductor memory card has various features such as being small and light weight, having large capacity and resistance to quake, and being easy and convenient to handle, and hence the demand for such a semiconductor memory card is increasing as a recording medium of a portable device such as a digital still camera or a portable telephone. Recently, a slot for the semiconductor memory card is provided as a standard not only in the portable device but also in a stationary device such as a digital television and a DVD recorder, and thus the demand for the semiconductor memory card is further increasing.

The semiconductor memory card described above includes a flash memory (mainly NAND flash memory) serving as a non-volatile main storage memory, and a memory controller for controlling the same. The memory controller carries out read/write control of data with respect to the flash memory in accordance with a read/write command of data from an access device represented by a digital still camera main body, or the like.

The writing of data from the memory controller to the flash memory is carried out in units called a page. The main stream in a recent flash memory is a page size of about 4 kB (kilobyte) or 8 kB.

The flash memory includes a number of memory elements called cells, and stores information by accumulating charges in each cell or discharging charges from each cell. However, the information stored in the cell may get lost due to degradation of the cell or the like. The memory controller thus generally generates an error correcting code with respect to write data from the access device, and stores the same in the flash memory with the write data. Thus, even if an error occurs during the reading of the data, correction can be made if the number of error bits is within a correction capability of the error correcting code to be applied, so that correct data can be read. For example, Japanese Patent Publication No. 2005-292925 proposes a method of alternately storing the write data (user data) and the error correcting code (additional data) in a page of the flash memory.

In the method described above, however, correct data cannot be read if an error beyond the correction capability of the error correcting code occurs during the reading of the data.

SUMMARY

The present invention has been made in view of the above problems, and an object of the present invention is to provide a non-volatile storage device capable of reading data correctly even if an error beyond the correction capability of the error correcting code occurs during the reading of the data.

To solve the above problems, the present inventors have devised a method of further giving a second error correcting code with respect to a set of data to which an error correcting code (hereinafter referred to as first error correcting code) is given. For example, the present inventors have devised a method of giving a parity of one page with respect to the data for four pages as the second error correcting code. In this manner, even if an error beyond the correction capability of the first error correcting code occurs, correct data can be read by using the second error correcting code (parity).

However, in the method described above, the data unit managed by the memory controller becomes large if the second error correcting code is given, and hence the overhead becomes large if the data size of the data write from the access device is small and the speed of the data write lowers.

Since the parity for one page is given to the data for four pages in the previous example, the memory controller carries out management of input/output data in units of five pages. For example, even if the size of the data write from the access device is one page, the memory controller writes a total of five pages, the data for four pages and the parity for one page with respect thereto, in the flash memory. In this case, one page of the data for four pages is configured by data received from the access device, but the remaining three pages are configured by existing data read from the non-volatile memory. Therefore, the overhead in this case inevitably becomes large compared to the case in which the size of the data write from the access device is four pages.

Further, the present invention has been made in view of the above problems, and provides a non-volatile storage device and a memory controller capable of efficiently carrying out writing of data of a small data size even if the first and second error correcting codes are given in the writing of data to the non-volatile memory.

A non-volatile storage device according to the present invention relates to a non-volatile storage device, which communicates with an access device and carries out reading and/or writing of data in accordance with a command from the access device, the device including one or more non-volatile memories for storing data; and a memory controller for carrying out control of the non-volatile memory; wherein the non-volatile memory includes a plurality of blocks, which are erase units, each of the blocks including a plurality of pages, which are write units of data; and the memory controller arranges a first logical block in one region by combining the plurality of blocks, and arranges a second logical block in a different region by combining the plurality of blocks, assigns a plurality of error correcting groups each configured by the plurality of pages to the first logical block, assigns data and first and second error correcting codes with respect to the data to the error correcting group, assigns a plurality of multiplexed groups each configured by the plurality of pages to the second logical block, multiplexes and assigns the data and the first error correcting code with respect to the data to the multiplexed group, writes data to the second logical block when a data size is smaller than a predetermined size and writes data to the first logical block when the data size is greater than or equal to a predetermined size when writing data, and includes a valid data management table for managing which one of the logical blocks, the first logical block and the second logical block, stores the valid data with respect to an identical logical address.

A memory controller according to the present invention relates to a memory controller for carrying out control of one or more non-volatile memories for storing data, wherein the non-volatile memory includes a plurality of blocks, which are erase units, each of the blocks including a plurality of pages, which are write units of data; and the memory controller arranges a first logical block in one region by combining the plurality of blocks, and arranges a second logical block in a different region by combining the plurality of blocks, assigns a plurality of error correcting groups each configured by the plurality of pages to the first logical block, assigns data and first and second error correcting codes with respect to the data to the error correcting group, assigns a plurality of multiplexed groups each configured by the plurality of pages to the second logical block, multiplexes and assigns the data and the first error correcting code with respect to the data to the multiplexed group, writes data to the second logical block when a data size is smaller than a predetermined size and writes data to the first logical block when the data size is greater than or equal to a predetermined size when writing data, and includes a valid data management table for managing which one of the logical blocks, the first logical block and the second logical block, stores the valid data with respect to an identical logical address.

According to the present invention, there are provided a non-volatile storage device and a memory controller capable of correctly reading data even if an error beyond a correction capability of a first error correcting code occurs when reading data by giving a second error correcting code to a set of data to which a first error correcting code is given and then storing the same in a non-volatile memory. Furthermore, according to the present invention, there are provided a non-volatile storage device and a memory controller capable of efficiently carrying out writing of data of a small size even if first and second error correcting codes are given in the writing of data to a non-volatile memory by arranging a multiplexed group in a second logical block to write data smaller than a predetermined size.

BRIEF DESCRIPTION OF DRAWINGS

FIG. 5 is a diagram showing an example of a logical-physical conversion table according to the first embodiment of the present invention;

FIG. 6 is a diagram showing an example of a valid data management table according to the first embodiment of the present invention;

DETAILED DESCRIPTION OF PREFERRED EMBODIMENT

Hereinafter, embodiments of the present invention will be described with reference to the drawings.

First Embodiment 1.1 Configuration of Non-Volatile Storage System

A configuration of a non-volatile storage system 1000 according to a first embodiment of the present invention will be described with reference to FIGS. 1 to 6.

Figure 1:
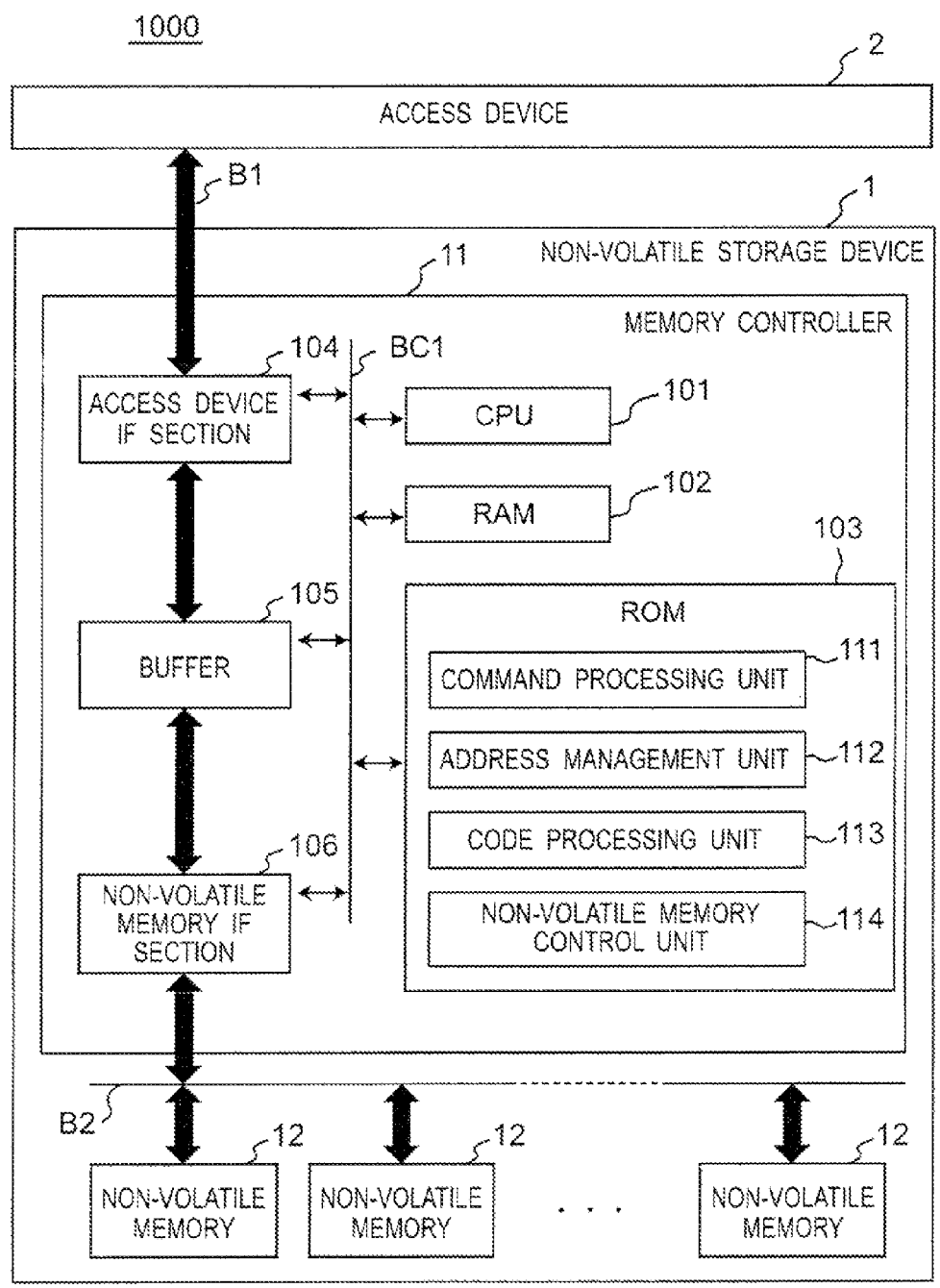
FIG. 1 is a schematic configuration diagram of a non-volatile storage system according to a first embodiment of the present invention.

FIG. 1 is a schematic configuration diagram of the non-volatile storage system 1000 according to the first embodiment of the present invention. As shown in FIG. 1, the non-volatile storage system 1000 includes a non-volatile storage device 1 and an access device 2, to which the non-volatile storage device 1 is attached. The non-volatile storage device 1 and the access device 2 are connected by a bus B1, so that communication can be carried out bi-directionally. The non-volatile storage device 1 carries out reading and/or writing of data in accordance with a command from the access device 2. In this case, the non-volatile storage device 1 is, for example, a semiconductor memory card. The access device 2 is, for example, a digital still camera for recording a still image content in a semiconductor memory card.

As shown in FIG. 1, the non-volatile storage device 1 includes a memory controller 11, and one or more non-volatile memories 12 for storing data. The memory controller 11 and the non-volatile memory 12 are connected by a bus B2. The memory controller 11 transmits and receives data, that is, carries out reading/writing of data as well as transmission of a command and reception of a response with the non-volatile memory 12 via the bus B2 to control the non-volatile memory 12. If a plurality of non-volatile memory 12 are provided, a plurality of bus B2 may be provided.

The memory controller 11 is a module that carries out the entire control of the non-volatile storage device 1, and is configured, for example, as an LSI (Large Scale Integration) including a CPU and the like. The non-volatile memory 12 is, for example, a NAND flash memory.

As shown in FIG. 1, the memory controller 11 includes a CPU 101, RAM 102, a ROM 103, an access device IF (interface) section 104, a buffer 105, and a non-volatile memory IF (interface) section 106. As shown in FIG. 1, each function section of the memory controller 11 is connected via a bus BC1. The memory controller 11 may have a configuration in which all or part of the function sections of the memory controller 11 are directly connected.

The access device IF section 104 is a connecting section of the non-volatile storage device 1 and the access device 2. The transmission and reception of control signals and data of the access device 2 and the non-volatile storage device 1 are carried out through the access device IF section 104.

The non-volatile memory IF section 106 is a connecting section of the memory controller 11 and the non-volatile memory 12. The transmission and reception of control signals and data of the memory controller 11 and the non-volatile memory 12 are carried out through the non-volatile memory IF section 106.

The buffer 105 is a memory for temporarily storing data received from the access device 2 via the access device IF section 104, data transmitted (output) to the access device 2 via the access device IF section 104, data read from the non-volatile memory 12 via the non-volatile memory IF section 106, date to write to the non-volatile memory 12 via the non-volatile memory IF section 106, and the like.

The ROM 103 stores a program for controlling the non-volatile storage device 1. This program is loaded to the RAM 102 and then executed by the CPU 101.

Specifically, as shown in FIG. 1, the ROM 103 includes a command processing unit 111, an address management unit 112, a code processing unit 113, and a non-volatile memory control unit 114. In the present embodiment, the command processing unit 111, the address management unit 112, the code processing unit 113, and the non-volatile memory control unit 114 are assumed to be implemented by software on the ROM 103, but the present invention is not limited thereto, and all or part of the command processing unit 111, the address management unit 112, the code processing unit 113, and the non-volatile memory control unit 114 may be implemented by hardware.

The command processing unit 111 is a function unit for interpreting the command and the parameter related to the command received from the access device 2 via the access device IF section 104, and executing the process of the command.

The address management unit 112 carries out the overall address management of the non-volatile memory 12, but valid data is not stored in the address management unit 112 itself. First, the address management unit 112 manages a physical address of a logical-physical conversion table (to be described later) in which a logical address in a logical address space provided by the non-volatile storage device 1 as an address space accessible from the access device 2, and a physical address in the non-volatile memory 12 are associated. The address management unit 112 manages the physical address of the valid data management table, to be described later. Furthermore, the address management unit 112 manages a physical address of a free block, which is a block reusable for data write, a physical address of a defective block not usable for data write, and the like.

The code processing unit 113 carries out processing of the first and second error correcting codes with respect to the data read or written with respect the non-volatile memory 12. The error correcting code herein is, for example, a Reed Solomon code or parity.

The code processing unit 113 generates the first error correcting code with respect to the data at the time of writing data to the non-volatile memory 12. Furthermore, the code processing unit 113 generates the second error correcting code with respect to the data and the first correcting code of the relevant data. The data, the first error correcting code, and the second error correcting code are then written to the non-volatile memory 12.

Further, the code processing unit 113 reads the first error correcting code with the data when reading data from the non-volatile memory 12, and carries out detection and correction of error of the read data. If an error in which correction cannot be made by the first error correcting code is detected, the second error correcting code is further read from the non-volatile memory 12, and the detection and correction of the error are carried out.

The non-volatile memory control unit 114 is a device driver for processing a control signal transmitted and received via the non-volatile memory IF section 106.

Figure 2:
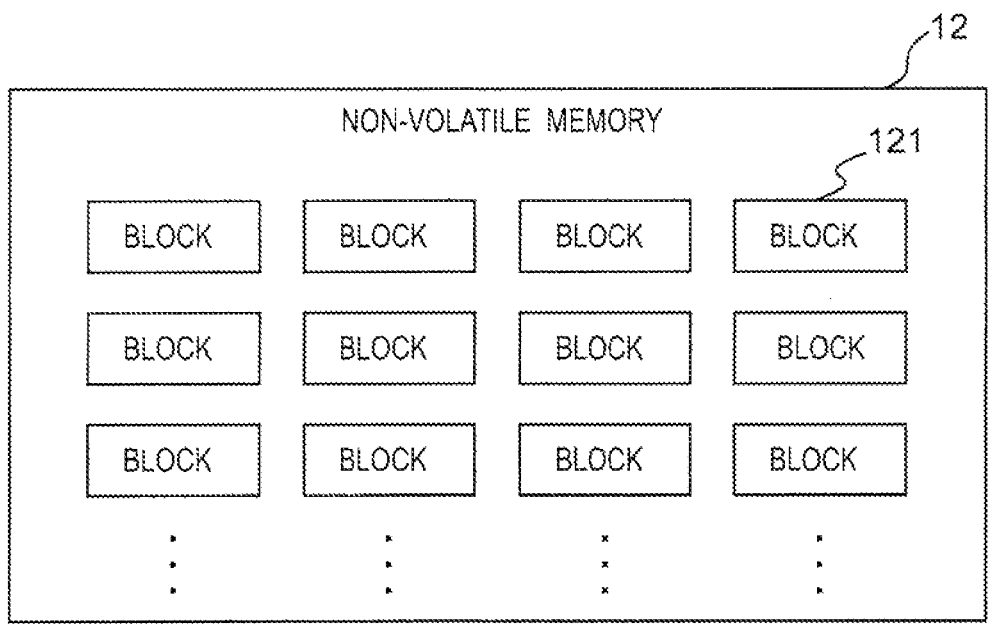
FIG. 2 is a diagram showing a configuration example of a non-volatile memory according to the first embodiment of the present invention.

FIG. 2 is a diagram showing a configuration example of the non-volatile memory 12 according to the present embodiment. The non-volatile memory 12 includes a plurality of blocks (physical blocks) 121, which are erase units of data. The size of each block 121 is about 1 MB (megabyte).

Figure 3:
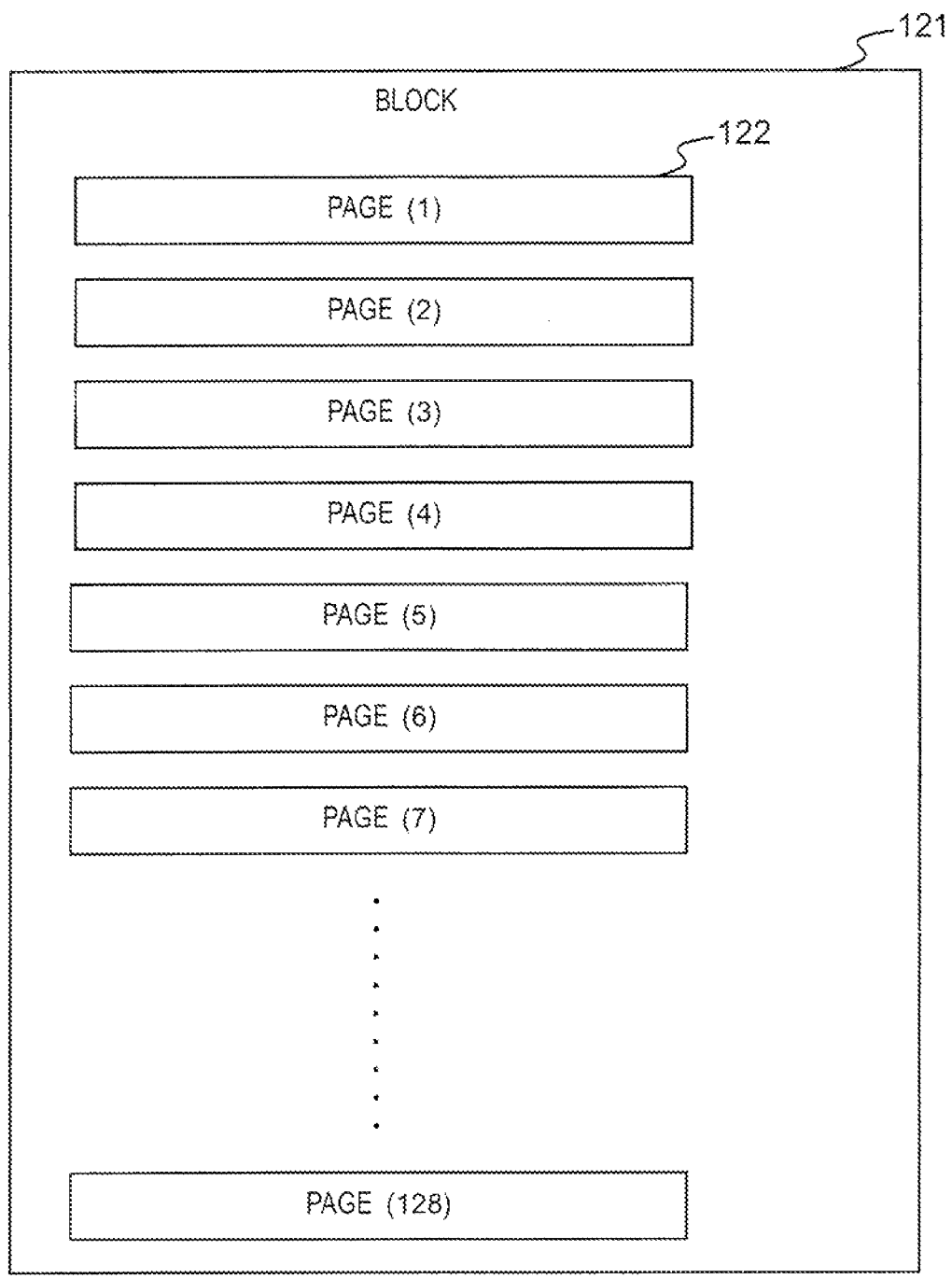
FIG. 3 is a diagram showing a configuration example of a block shown in FIG. 2.

FIG. 3 is a diagram showing a configuration example of the block 121 shown in FIG. 2. The block 121 includes a plurality of pages 122, which are write units of data. The size of each page 122 is about 8 kB, for example. The number of pages per one block 121 is, for example, 128 pages.

Figure 4:
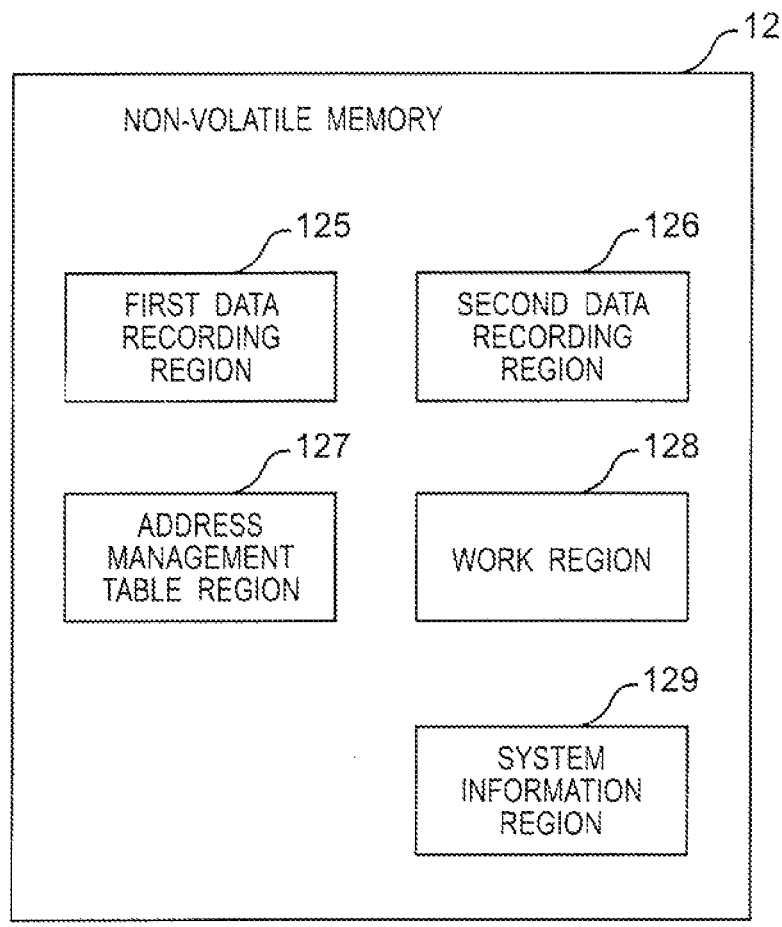
FIG. 4 is a diagram showing a region set in the non-volatile memory according to the first embodiment of the present invention.

FIG. 4 is a diagram showing a region set in the non-volatile memory 12 according to the present embodiment. The region in the non-volatile memory 12 herein is divided based on the type of information stored in the non-volatile memory 12. The region set in the non-volatile memory 12 includes a first data recording region 125, a second data recording region 126, an address management table region 127, a work region 128, a system information region 129, and the like.

The first data recording region 125 is a region for storing the write data from the access device 2. The first and second error correcting codes with respect to the data are also stored in addition to the data from the access device 2.

The first data recording region 125 is assigned with a physical capacity greater than or equal to a physical capacity capable of storing the entire data of the readable/writable logical address space provided from the non-volatile storage device 1 to the access device 2.

The second data recording region 126 is a region for storing the write data from the access device 2. The first error correcting code with respect to the data is also stored in addition to the data from the access device 2. In the second data recording region 126, the data and the first error correcting code with respect to the data from the access device 2 are duplicated (mirrored) and stored.

The second data recording region 126 is assigned with a physical capacity capable of storing the data of part of the readable/writable logical address space provided from the non-volatile storage device 1 to the access device 2. For example, a capacity of about a few percent of the readable/writable logical address space is assigned.

Therefore, the first data recording region 125 and the second data recording region 126 are both regions for storing the write data from the access device 2, but are selectively used according to the size of the write data, as will be described later.

When the non-volatile storage device 1 according to the present embodiment is manufactured and shipped, a state is obtained in which all initialized data are written only to the first data recording region 125. As will be described later, if the size(s) of the write data is(are) all greater than or equal to the page size at the time of the actual data write from the access device 2, the write data is(are) stored only in the first data recording region 125.

On the other hand, as will be described in detail later, if the size of the write data is smaller than the page size at the time of the actual data write from the access device 2, the write data is stored in the second data recording region 126. Therefore, the data may be stored in both the first data recording region 125 and the second data recording region 126 with respect to a certain (logical) address in the logical address space of the non-volatile storage device 1.

In such a case, the data of each region with respect to the same logical address may not be the same. In the writing process to be described later, the write data from the access device 2 is selectively written to either the first data recording region 125 or the second data recording region 126 according to the size of the data, and hence the data of either region, that is, the data written last with respect to a predetermined logical address by the access device 2 becomes valid. Which data is the valid one is managed by the address management unit 112 and the valid data management table.

The address management table region 127 is a region for storing various types of table information necessary for the address management unit 112 to carry out address management. The various types of table information includes a conversion table of a logical address and a physical address (hereinafter referred to as "logical-physical conversion table"), a table for managing the valid data stored in the second data recording region 126 (hereinafter referred to as "valid data management table"), an address table of a free block, and the like.

The work region 128 is a region configured by free blocks and not stored with valid data.

The system information region 129 is a region for storing system information interiorly used by the memory controller 11. Furthermore, the first and second error correcting codes with respect to the system information are also stored. Part or all of the system information may be duplicated (mirrored) and stored.

FIG. 5 is a diagram showing an example of the logical-physical conversion table according to the present embodiment. The logical-physical conversion table stored in the address management table region 127 of the non-volatile memory 12 stores corresponding information of the address of the logical block and the address of the physical block in each region of the non-volatile memory 12.

In FIG. 5, "0x" indicates that the value is a hexadecimal number. As shown in FIG. 5, the logical address space of the first data recording region 125 is assumed to coincide with the readable/writable logical address space provided by the non-volatile storage device 1 with respect to the access device 2, and the logical address space of other regions (e.g., second data recording region 126) is assumed to represent a virtual space different from the above. The high four bits of the physical block address are identification numbers of the non-volatile memory 12, and the other bits are identification numbers of the block in the non-volatile memory 12. In the example shown in FIG. 5, the blocks (identification number in each non-volatile memory 12 is 0x0010, 0x0010, 0x0010, 0x0010, 0x0010) in the five different non-volatile memories 12 (identification number is 0, 1, 2, 3, 4) are assigned with respect to the logical block having the logical block address of 0x0000.

As will be described later, the data arrangement method differs in the first data recording region 125 and the second data recording region 126, respectively, but in either case, one logical block is made up of five physical blocks. Accordingly, the address management by the address management unit 112 is simplified.

FIG. 6 is a diagram showing an example of the valid data management table according to the present embodiment. The valid data management table stored in the address management table region 127 of the non-volatile memory 12 is a table for managing valid data stored in the second data recording region 126 (i.e., data written last to predetermined logical address by access device 2). In the examples shown in FIGS. 5 and 6, the data worth one page (e.g., 8 kB) in the logical address space of the access device 2 is assumed to be stored with respect to one of the virtual logical blocks assigned to the second data recording region 126 to clarify and simplify the description.

In the valid data management table shown in FIG. 6, the following addresses are managed as a set: the address of the virtual logical block (logical block address in FIG. 5), the logical address (logical block address, logical page address) for one page of the access device 2 stored in the relevant logical block, the physical address (physical block address, physical page address) where the relevant data is stored, and the physical address (physical block address, physical page address) where copy data (other duplicated data) of the relevant data is stored.

Here, if valid data is not stored in a certain logical block, the address management unit 112 sets an invalid value to the logical address of data, so that determination can be made that valid data is not stored in the logical block. When setting an invalid value in the logical address of data in the valid data management table, the address management unit 112 sets, for example, the value of the logical block to "0xFFFF", and sets the value of the logical page to "0xFFF".

Therefore, by referencing the valid data management table, the address management unit 112 can determine whether or not valid data with respect to a predetermined logical address is stored in the second data recording region 126. Furthermore, if valid data is stored in the second data recording region 126, a physical position (address) in the second data recording region 126 can be specified.

1.2 Arrangement of Error Correcting Code

Next, the arrangement of the first and second error correcting codes when the memory controller 11 stores data in the non-volatile memory 12 will be described with reference to FIGS. 7 to 10.

Figure 7:
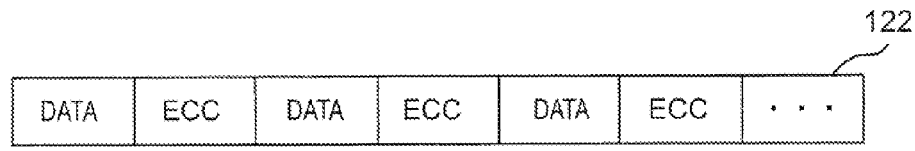
FIG. 7 is a diagram showing one example of a configuration of a data page according to the first embodiment of the present invention.

FIG. 7 is a diagram showing one example of a configuration of a page storing the data (hereinafter referred to as data page) according to the present embodiment. In the data page, the data and the first error correcting code with respect to the relevant data are arranged in the page. In FIG. 7, the first error correcting code is described as "ECC".

As shown in FIG. 7, when giving the first error correcting code in a divided manner with respect to the data stored in the page, the data and the first error correcting code are alternately arranged with the divided data and the first error correcting code with respect to the divided data as a set.

When reading the data from the non-volatile memory 12, the first error correcting code with respect to the data is always read with the data, and thus the overhead of a control signal at the time of reading (e.g., address specification or the like) can be reduced by continuously arranging them in the same page.

Figure 8:
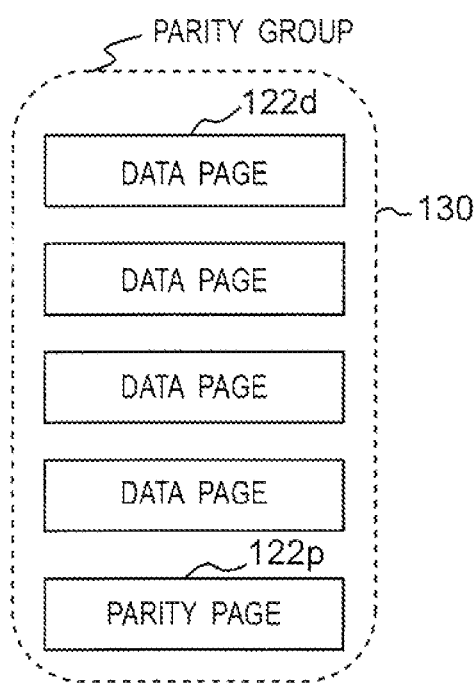
FIG. 8 is a diagram showing an example of a parity group according to the first embodiment of the present invention.

FIG. 8 is a diagram showing an example in which the second error correcting code is given to one or more data pages, according to the present embodiment. In the present embodiment, parity is used for the second error correcting code, and a page storing the second error correcting code is referred to as a parity page. Hereinafter, a combination of one or more data pages and the parity page with respect to such data pages is referred to as "parity group".

The error correcting code other than the parity (e.g., Reed Solomon code) may be used as the second error correcting code. In this case, the parity group may be more generally referred to as an error correcting group.

In the example shown in FIG. 8, one parity page is given with respect to four data pages to configure one parity group. In the parity page, for example, the value of XOR (exclusive OR) of the data stored in each data page is stored. Furthermore, the first error correcting code with respect to the value of the XOR is stored.

In the example shown in FIG. 8, the ratio of the data page and the parity page is 4 to 1, but other arbitrary ratios may be applied. The capacity of data that can be stored in the non-volatile memory 12 increases as the ratio of the data page becomes greater. The error correction capability with respect to the data page increases as the ratio of the parity page becomes greater.

Figure 9:
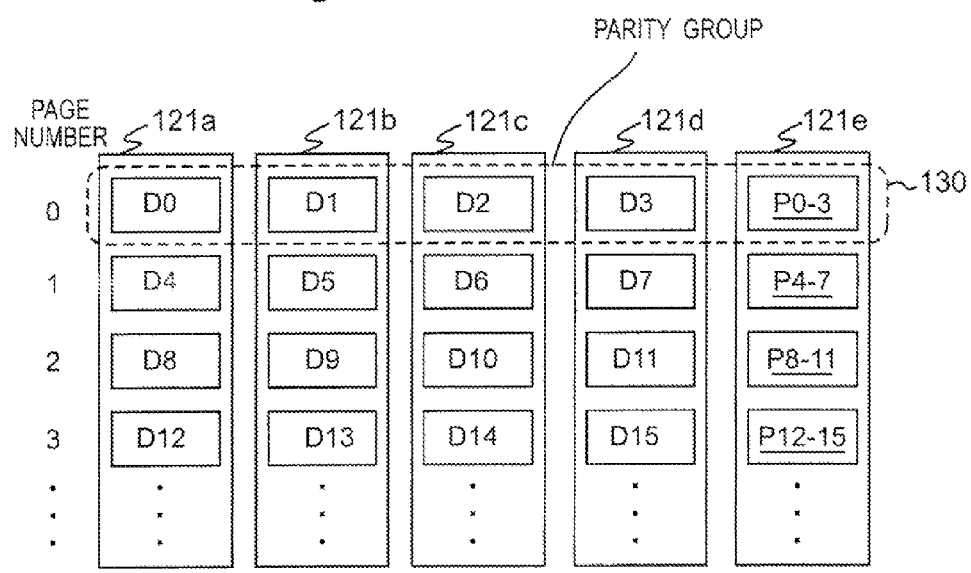
FIG. 9 is a diagram showing one example of an arrangement of the parity group according to the first embodiment of the present invention.

FIG. 9 is a diagram showing one example of an arrangement of a parity group according to the present embodiment. The arrangement shown in FIG. 9 is applied to the first data recording region 125, which are regions for storing the parity (second error correcting code), and the system information region 129.

In FIG. 9, D0, D1, ..., D15 represent the data page, P0-3 represents the parity page with respect to the data pages D0 to D3, P4-7 represents the parity page with respect to the data pages D4 to D7, P8-11 represents the parity page with respect to the data pages D8 to D11, P12-15 represents the parity page with respect to the data pages D12 to D15.

Each parity group is arranged over five physical blocks 121a, 121b, 121c, 121d, 121e. Thus, the reading and writing of data to each parity group become parallel access to different physical blocks and can be carried out at high speed. Similarly, the reading and writing of successive parity groups can be carried out at high speed.

The address management process in the address management unit 112 can be simplified by configuring and arranging the parity group such that the parity group is not arranged over a plurality of logical blocks. In the example of FIG. 9 showing the arrangement of the parity group, the management in the address management unit 112 can be simplified by managing the five physical blocks 121a, 121b, 121c, 121d, 121e as one logical block.

Figure 10:
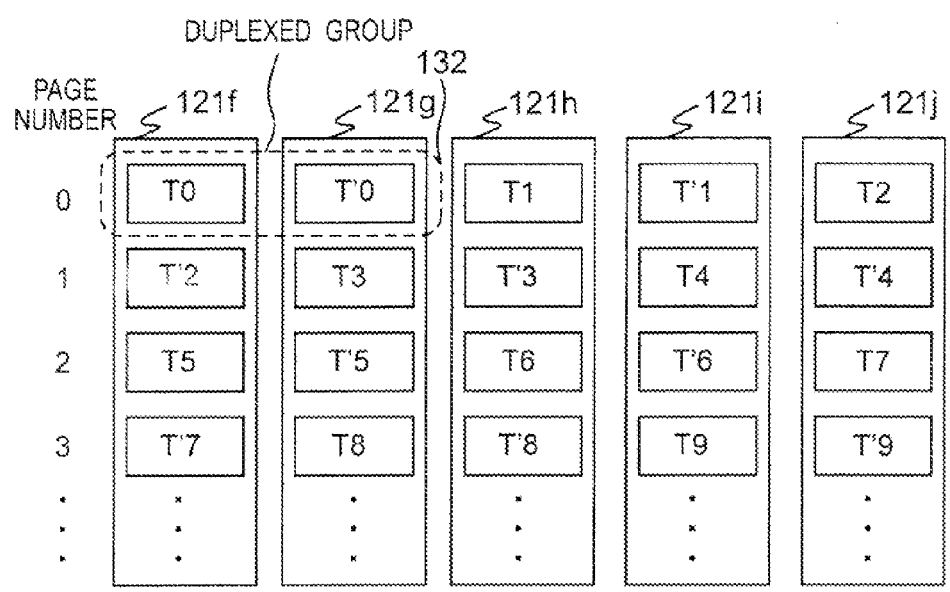
FIG. 10 is a diagram showing one example of an arrangement of a duplexed group according to the first embodiment of the present invention.

FIG. 10 is a diagram showing one example of an arrangement of a duplexed group according to the present embodiment. The duplexed group is a group configured by the duplicated (mirrored) data pages and is configured by two pages, the data page and the copy thereof. The arrangement shown in FIG. 10 is applied to the second data recording region 126 and the system information region 129, which are regions to apply duplexing.

In FIG. 10, T0, T1, ..., T9 represent the data page, and T'0, T'1, ..., T'9 represent the copies with respect to the data pages T0, T1, ..., T9.

Each duplexed group is arranged across two of the five blocks 121f, 121g, 121h, 121i, 121j. Thus, the reading and writing of each duplexed group become parallel accesses to the different physical blocks, and can be carried out at high speed. Similarly, the reading and writing of the successive duplexed groups can be carried out at high speed.

The duplexed group may be configured such that the duplexed group is not arranged across a plurality of logical blocks. Accordingly, the address management process in the address management unit 112 can be simplified.

As described above, the first data recording region 125 is assigned with a physical capacity greater than or equal to a physical capacity capable of storing the entire data of the readable/writable logical address space provided from the non-volatile storage device 1 to the access device 2. On the other hand, the second data recording region 126 is assigned with the physical capacity capable of storing the data of part of the readable/writable logical address space provided from the non-volatile storage device 1 to the access device 2. For example, a capacity of about a few percent of the readable/writable logical address space is assigned. Therefore, the size of the logical address space configured by the logical blocks arranged in the second data recording region 126 is smaller than the size of the logical address configured by the logical blocks arranged in the first data recording region 125.

Furthermore, the size of the logical block (number of logical blocks) of the duplexed group in FIG. 10 may be the size of the logical block (number of logical blocks) same as the logical block arranging the parity group shown in FIG. 9, so that the address management process in the address management unit 112 can be further simplified. In the example of FIG. 10 showing the arrangement of the duplexed group, the management in the address management unit 112 is simplified by managing the five blocks 121f, 121g, 121h, 121i, 121j as one logical block.

1.3 Operation of Non-Volatile Storage System

Figure 11:
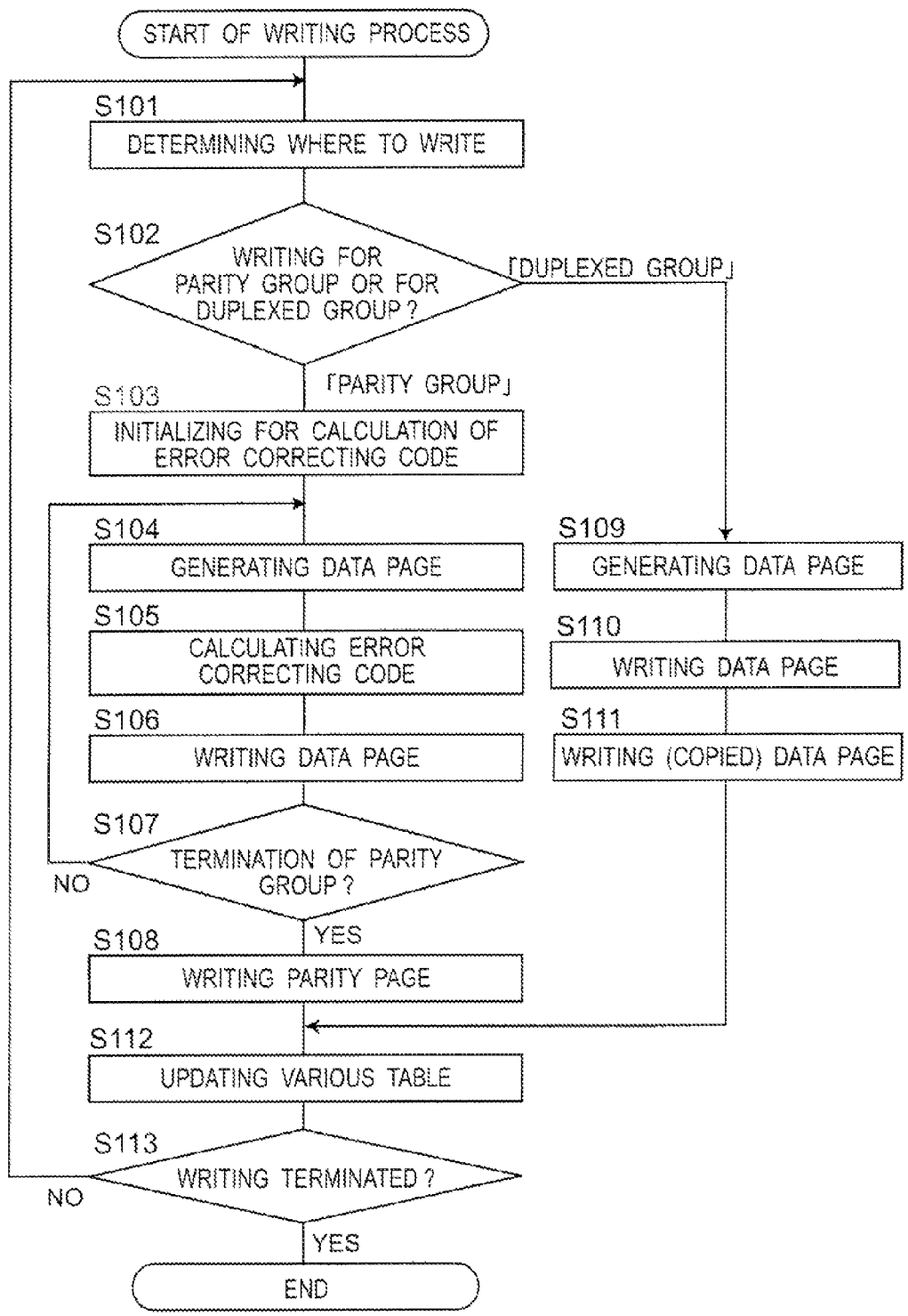
FIG. 11 is a flowchart showing a procedure of a writing process of the non-volatile storage device according to the first embodiment of the present invention.
Figure 12:
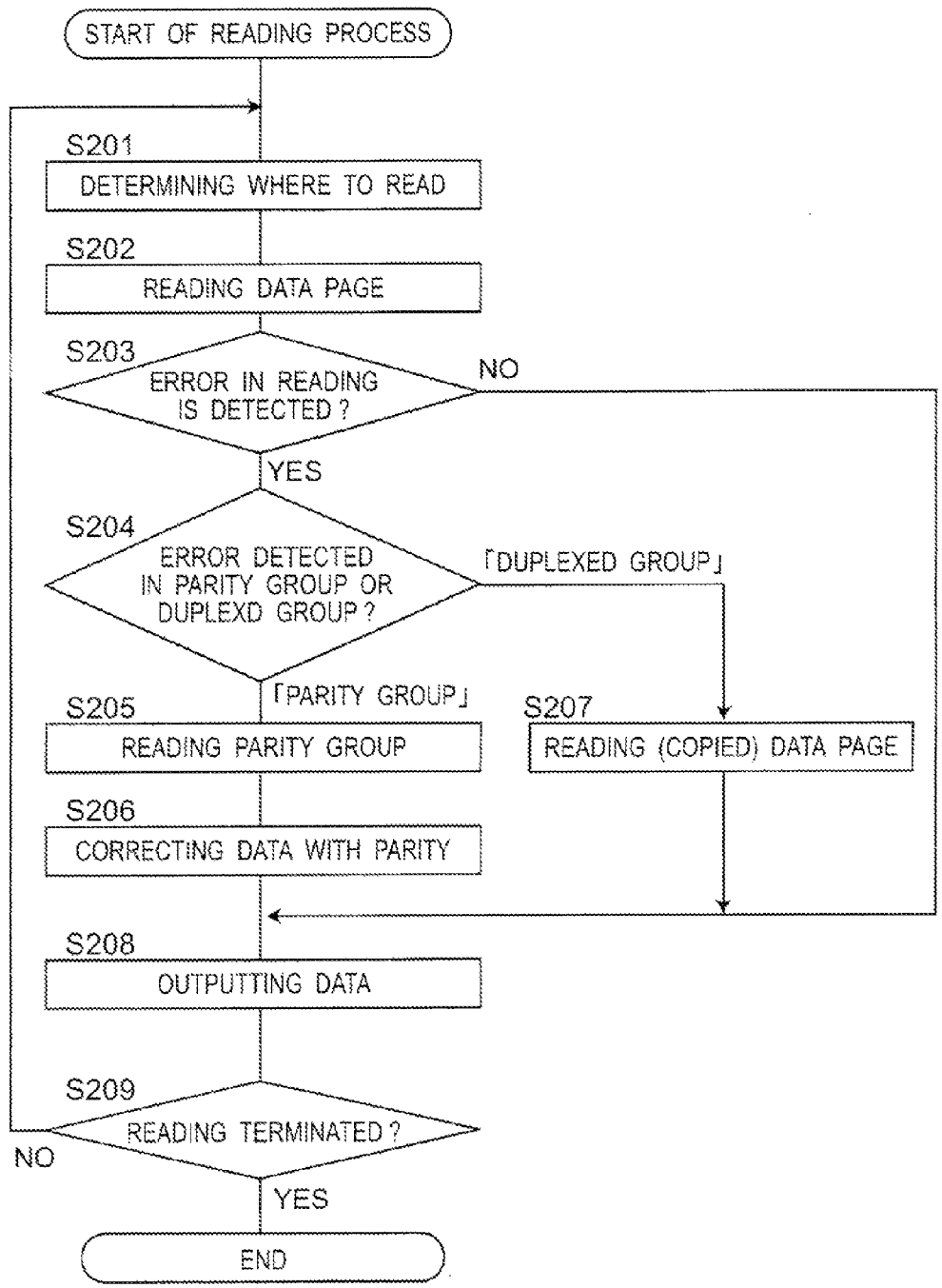
FIG. 12 is a flowchart showing a procedure of a reading process of the non-volatile storage device according to the first embodiment of the present invention.
Figure 13:
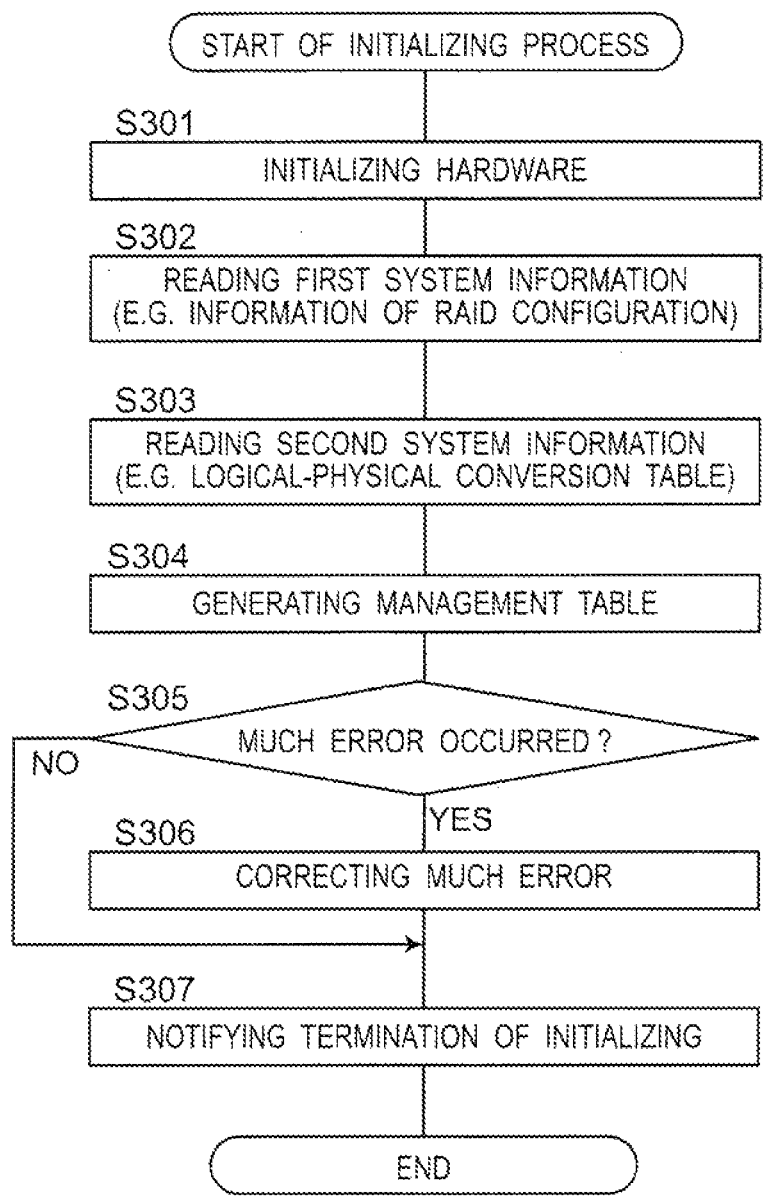
FIG. 13 is a flowchart showing a procedure of an initialization process of the non-volatile storage device according to the first embodiment of the present invention.

Next, the operation of the non-volatile storage system 1000 will be described with reference to FIGS. 11 to 13.

The non-volatile storage device 1 is attached to the access device 2, and performs the process corresponding to the command issued by the access device 2. The access device 2 issues a command (e.g., write command or read command) necessary for recording and reproduction of still image data, moving image data, and the like to the non-volatile storage device 1, and carries out transmission and reception of the data.

1.3.1 Writing Process

The access device 2 issues the write command to the non-volatile storage device 1 and transfers the write data so that the writing process is carried out in the non-volatile storage device 1. FIG. 11 is a flowchart showing a procedure of the writing process of the non-volatile storage device 1 according to the first embodiment of the present invention.

First, the process in step S101 will be described. In the non-volatile storage device 1, upon receiving the write command from the access device 2 through the access device IF section 104, the command processing unit 111 acquires parameters such as write address and size associated with the write command. From these parameters, the command processing unit 111 determines whether to write the received data in the first data recording region 125 as a parity group or to write in the second data recording region 126 as duplexed group. In the present embodiment, determination is made to carry out the writing of the former case when the size of the write data is greater than or equal to the page size, and the writing of the latter case when the size of the write data is smaller than the page size. The logical address of the parity group or the duplexed group for carrying out the writing is specified, and such information is notified to the address management unit 112.

The address management unit 112 determines a physical write destination in the non-volatile memory 12 by referencing the information acquired from the command processing unit 111, the information of the conversion table of the logical address and the physical address, the address information of the free block, and the information of a table managing the write state to the block (i.e., state related to data of what logical address is written up to which page in which block).

Next, the process in step S102 will be described. If the command processing unit 111 selects the writing for the parity group in the process of step S101, the process proceeds to the process in step S103. Herein, a case in which the command processing unit 111 selects the writing for the parity group is when the size of the write data is greater than or equal to the page size. On the other hand, when the command processing unit 111 selects the writing for the duplexed group, the process proceeds to step S109. Herein, a case in which the command processing unit 111 selects the writing for the duplexed group is when the size of the write data is smaller than the page size.

Next, the process in step S103 will be described. The command processing unit 111 instructs the code processing unit 113 to prepare for the writing of the parity group. The code processing unit 113 ensures a region for calculation of the second error correcting code in the buffer 105, and sets a value of this region as an initial value.

Next, the process in step S104 will be described. The command processing unit 111 stores the write data from the access device 2 to the buffer 105 through the access device IF section 104. The code processing unit 113 generates the first error correcting code with respect to the write data. The information of the data page including the write data and the first error correcting code thereof is generated in the buffer 105. In generating the information of the data page, if the write data received from the access device 2 is not sufficient for it (e.g., when the access device 2 instructs writing from the address in the middle of the parity group or data page), the address management unit 112 is referenced to read the existing data of the non-volatile storage device 1 and generate the first error correcting code with respect thereto. The insufficiency in information of the data page is compensated by the existing data and the first error correcting code with respect thereto.

Next, the process in step S105 will be described. The code processing unit 113 references the value set in the region for calculation of the second error correcting code ensured in step S103 and the information of the data page generated in step S104 to carry out the calculation of the second error correcting code (e.g., XOR (exclusive OR) calculation), and rewrites the result to the region for calculation of the second error correcting code ensured in step S103.

Next, the process in step S106 will be described. The non-volatile memory control unit 114 writes the information of the data page generated in step S105 to the physical write destination determined in step S101 through the non-volatile memory IF section 106.

Next, the process in step S107 will be described. If the data page written in immediately previous step S106 is the termination of the parity group, the process proceeds to the process of step S108. If not, the process returns to the process of step S104, and the processing of the next data page in the parity group is carried out.

Next, the process in step S108 will be described. The code processing unit 113 generates the first error correcting code with respect to the parity, with the calculation result of the second error correcting code generated in step S105 as the parity. The non-volatile memory control unit 114 writes the parity and the first error correcting code thereof as the parity page in the physical write destination determined in step S101 through the non-volatile memory IF section 106. Thereafter, the process proceeds to the process of step S112.

Next, the process in step S109 will be described. The process of step S109 is the same as that of step S104, and the information of the data page is generated on the buffer 105.

Next, the process in step S110 will be described. The non-volatile memory control unit 114 writes the information of the data page generated in step S109 in the physical write destination determined in step S101 through the non-volatile memory IF section 106.

Next, the process in step S111 will be described. The non-volatile memory control unit 114 writes the information of the data page generated in step S109 to the physical write destination determined in step S101 through the non-volatile memory IF section 106. Therefore, the same data page are duplicated and written in step S110 and step S111. Thereafter, the process proceeds to the process of step S112.

Next, the process in step S112 will be described. The address management unit 112 reflects the result of the writing of the parity group from step S103 to step S108 or the result of the writing of the duplexed group from step S109 to step S111 on the various types of table information such as the logical-physical conversion table and the valid data management table. That is, when the writing of the duplexed group is carried out, the information of the valid data management table is updated. When the writing of the parity group is carried out, the update to make the registration of the logical address in the valid data management table invalid is carried out if the writing is carried out on the logical address registered in the valid data management table. If a predetermined condition matches (e.g., writing is carried out to boundary of logical blocks), the non-volatile memory control unit 114 writes the table information, updated by taking in the matched condition, in the address management table region 127 through the non-volatile memory IF section 106.

Next, the process in step S113 will be described. If all the write data from the access device 2 is written, the writing process is terminated. If not, the process returns to the process of step S101, and as for the data from the access device 2, the writing of data for which writing is not yet carried out is continued.

As described above, in the non-volatile memory device 1 according to the present embodiment, the writing of a total of two pages, data page for one page and a copy (data page) for one page, is carried out in the writing process for smaller than the page size in the access device 2. The number of pages (two pages) in such writing is less than the number of write pages (five pages) required for updating the entire parity group, and thus the writing is efficiently carried out.

If the access device 2 manages the logical space in the non-volatile storage device 1 by the file system such as the FAT, the information of the file entry and the FAT may be frequently updated at a very small size of about one sector (e.g., 512 B). The writing process in the non-volatile storage device 1 according to the present invention is particularly effective in such a case.

Since the physical capacity of the second data recording region 126 is limited, only the data of the logical address of one part of the logical address space specified by the access device 2 can be stored. Therefore, if the second data recording region 126 is insufficient in the writing process, a process of moving the data stored in the second data recording region 126 to the first data recording region 125 to increase the availability of the second data recording region 126 becomes necessary. In order not to cause such a movement process as much as possible, the physical capacity of the second data recording region 126 is desirably determined according to the write pattern (combination of address, size) of the access device 2.

1.3.2 Reading Process

The reading process is carried out in the non-volatile storage device 1 when the access device 2 issues a read command to the non-volatile storage device 1. The read data is sequentially transferred from the non-volatile storage device 1 to the access device 2. FIG. 12 is a flowchart showing a procedure of the reading process of the non-volatile storage device 1 according to the first embodiment of the present invention.

First, the process in step S201 will be described. In the non-volatile storage device 1, when receiving the read command from the access device 2 through the access device IF section 104, the command processing unit 111 acquires parameters such as read address and size associated with the read command. From these parameters, the command processing unit 111 specifies the logical address of the parity group or the duplexed group to be read, and notifies the information to the address management unit 112. The address management unit 112 determines the physical read destination in the non-volatile memory 12 by referencing the information acquired from the command processing unit 111, the information of the conversion table of the logical address and the physical address, the address information of the free block, and the information of a table managing the write state to the block (i.e., state related to data of what logical address is written up to which page in which block).

In particular, the address management unit 112 references the valid data management table to determine whether the read destination is the parity group of the first data recording region 125 or the duplexed group of the second data recording region 126. If registration of the logical address to be read has been made in the valid data management table, the read destination becomes the duplexed group of the second data recording region 126.

Next, the process in step S202 will be described. The non-volatile memory control unit 114 carries out the reading of the information of the data page from the physical read destination determined in step S201 through the non-volatile memory IF section 106. The information of the read data page (i.e., data and first error correcting code with respect to data) is stored in the buffer 105.

Next, the process in step S203 will be described. The code processing unit 113 carries out error detection and correction of the data using the first error correcting code stored in the buffer 105 in step S202. If an error that cannot be corrected with the correction capability based on the first error correcting code is detected, the process proceeds to the process of step S204. In other cases, the error correction is carried out using the first error correcting code, the information after the error correction is overwritten on the data in the buffer 105, and the process proceeds to the process of step S208.

If the information of the data page read in step S202 includes information other than the read address specified by the access device 2 (e.g., when access device instructs reading from address in the middle of data page), the calculation of the first error correcting code with respect to the portion other than the read address may be omitted.

Next, the process in step S204 will be described. In the process of step S201, whether the data page on which the read error occurred in step S203 belongs to the parity group or belongs to the duplexed group is determined based on the information of the read destination determined by the address management unit 112. The process proceeds to the process of step S205 if the data page belongs to the parity group. The process proceeds to the process of step S207 if the data page belongs to the duplexed group.

Next, the process in step S205 will be described. The non-volatile memory control unit 114 carries out the reading of the information of the parity group, to which the data page subjected to the reading in step S202 belongs, from the physical read destination determined in step S201 through the non-volatile memory IF section 106. Since the first error correcting code is given to the information of the read parity group (i.e., data page other than data page for which reading is carried out in step S202, and parity page), the code processing unit 113 stores the data and the parity in the buffer 105 after carrying out the error correction of the data using the first error correcting code.

Next, the process in step S206 will be described. The code processing unit 113 carries out the error detection and correction of the data using the information of the data page and the parity page (second error correcting code) stored in the buffer in step S205. If an error that cannot be corrected with the correction capability based on the second error correcting code is detected, the error process (not shown) is carried out, and the reading process is terminated. In other cases, the error correction is carried out using the second error correcting code, the information after the error correction is overwritten on the data in the buffer 105, and the process proceeds to the process of step S208.

For example, if the XOR (exclusive OR) calculation is applied for the calculation of the second error correcting code, the XOR calculation of the data of the data page other than the data page for which the reading is carried out in step S202 and the parity of the parity page is carried out. Accordingly, the data of the data page for which the reading is carried out in step S202 is restored.

Next, the process in step S207 will be described. The non-volatile memory control unit 114 carries out the reading of the information (i.e., information of other data page) of the duplexed group, to which the data page subjected to the reading in step S202 belongs, from the physical read destination determined in step S201 through the non-volatile memory IF section 106. The information (i.e., data and first error correcting code with respect to data) of the read data page is stored in the buffer 105. The code processing unit 113 carries out the error detection and correction of the data using the first error correcting code stored in the buffer 105. If an error that cannot be corrected with the correction capability based on the first error correcting code is detected, the error process (not shown) is carried out, and the reading process is terminated. Otherwise, the error correction is carried out using the first error correcting code, the information after the error correction is overwritten on the data in the buffer 105, and the process proceeds to the process of step S208.

Next, the process in step S208 will be described. The command processing unit 111 transmits the data (after error correction process) stored in the buffer 105 to the access device 2 as read data.

Next, the process in step S209 will be described. If all the read data specified by the access device 2 is transmitted, the reading process is terminated. If not, the process returns to the process of step S201, and as for the data to the access device 2, the reading of non-transmitted read data is continued.

The reading from the non-volatile memory 12 in step S202 and step S205 is desirably carried out at high speed by the parallel process for a plurality of blocks if the read destination is the parity group. In this case, the process may proceed to the process of the next step immediately after the reading of the data page and the parity page is started.

1.3.3 Initialization Process

After the non-volatile storage device 1 is attached to the access device 2, and the power supply from the access device 2 to the non-volatile storage device 1 is started, the access device 2 issues an initialization command to the non-volatile storage device 1 to enable the reading and writing of data between the access device 2 and the non-volatile storage device 1. FIG. 13 is a flowchart showing a procedure of an initialization process of the non-volatile storage device 1 according to the first embodiment of the present invention.

First, the process in step S301 will be described. In the non-volatile storage device 1, upon receiving an initialization command from the access device 2 through the access device IF section 104, the command processing unit 111 carries out an initialization setting of the hardware of the memory controller 11. The connection check of the non-volatile memory 12 connected to the non-volatile memory IF section 106 and the like is also carried out.

Next, the process in step S302 will be described. The non-volatile memory control unit 114 reads first system information from a predetermined read destination of the non-volatile memory 12 through the non-volatile memory IF section 106. The first system information is information previously written in the non-volatile memory 12 at the time of the manufacturing of the non-volatile storage device 1, and includes various types of control information in the non-volatile storage device 1. The first system information may be the type and number of the non-volatile memory 12 connected to the memory controller 11, the configuring information of the parity group, the configuration information of the duplexed group, the type and correction capability of the first and second error correcting codes, the information related to a physical storage position of the second system information (to be described later), and the information related to the address of the initial defective block. When an error occurs in the reading of the first system information, the error correction by the first and/or second error correcting code is carried out.

The address management unit 112, the code processing unit 113, and the non-volatile memory control unit 114 carry out an internal initialization process according to the content of the read first system information.

Next, the process in step S303 will be described. The non-volatile memory control unit 114 reads the second system information from a predetermined read destination of the non-volatile memory 12 (e.g., specified in first system information) through the non-volatile memory IF section 106. The second system information is information previously written to the non-volatile memory 12 at the time of the manufacturing of the non-volatile memory device 1 and then updated when the non-volatile storage device 1 is used, and includes various types of control information in the non-volatile storage device 1. For example, the second system information includes the information related to the conversion table of the logical address and the physical address, the information related to the valid data management table, the information related to the address of the latecoming defective block, the information related to the number of write times and the number of erase times of the block, the information related to the address of the free block, and the information related to the parity table. When an error occurs in the reading of the second system information, the error correction by the first and/or second error correcting code is carried out.

Next, the process in step S304 will be described. The address management unit 112 generates in the RAM 102 the table information required for address management, according to the content of the read second system information.

Next, the process in step S305 will be described. When an error exceeding a predetermined amount (correctable with first or second error correcting code) occurs in the reading from the non-volatile memory 12 in step S302 and step S303, the process proceeds to the process of step S306. If not, the process proceeds to the process of step S307.

Next, the process in step S306 will be described. The code processing unit 113 generates the first and second error correcting codes with respect to the data of an area where the error exceeding a predetermined amount occurred in the reading from the non-volatile memory 12 in step S302 and step S303. The non-volatile memory control unit 114 then rewrites the data and the generated first and second error correcting codes to the non-volatile memory 12 as new first or second system information.

Next, the process in step S307 will be described. The command processing unit 111 notifies the access device 2 through the access device IF section 104 that the initialization process of the non-volatile storage device 1 is completed, and terminates the initialization process.

1.4 Conclusion

The non-volatile storage device 1 of the present embodiment 1 is a non-volatile storage device that can communicate with the access device 2, and that carries out reading and/or writing of data according to a command from the access device 2. The non-volatile storage device 1 includes one or more non-volatile memories for storing data, and a memory controller 11 for carrying out the control of the non-volatile memory 12. The non-volatile memory 12 includes the plurality of blocks 121, which are erase units, and the block 121 includes the plurality of pages 122, which are write units of data.

The memory controller 11 arranges the first logical block in the first data recording region 125 by combining a plurality of blocks 121. Furthermore, the memory controller 11 arranges the second logical block in the second data recording region 126 by combining the plurality of blocks. The memory controller 11 assigns a plurality of parity groups each configured by a plurality of pages 122 to the first logical block, and the data and the first and second error correcting code with respect to the data are respectively assigned to the relevant parity group. The memory controller 11 assigns a plurality of multiplexed groups each configured by a plurality of pages 122 to the second logical block, and the data and the first error correcting code with respect to the data are respectively multiplexed and assigned to the multiplexed group. Further, in writing the data, the memory controller 11 writes the data in the second logical block if the data size is smaller than a predetermined size, and writes the data in the first logical block when the data size is greater than or equal to a predetermined size, and includes a valid data management table for managing which one of the logical blocks, the first logical block and the second logical block, stores the valid data with respect to an identical logical address.

As described above, in the non-volatile storage device 1, the second error correcting code is also stored in addition to the first error correcting code stored in the same page as the data. When writing the data, the first and second error correcting codes are given to the data and then written. When reading the data, the error correction is carried out using the first and/or second error correcting code given to the data.

As a result, in the present embodiment, even if an error beyond the correction capability of the first error correcting code given to the data page occurs in the reading of the data page, the other data page and parity page configuring the parity group can be read and the information of the data page can be restored using the parity page (second error correcting code).

Furthermore, when the access device 2 carries out the writing to the non-volatile storage device 1 at a size smaller than a predetermined size, the duplexed group is configured, and the page data and the copy of the page data are written to the second data recording region 126 of the non-volatile memory 12. The size of the logical address space corresponding to the second data recording region 126 is set to be smaller than the size of the logical address space corresponding to the first data recording region 125 (of the non-volatile memory 12) to which the data of a size greater than a predetermined size is written. As a result, the number of write pages to the non-volatile memory 12 at the time of the data write of a size smaller than a predetermined size can be reduced, and efficient writing can be realized.

The values described in the above embodiment is merely an example, and other values may be used. For example, the values of the respective number of pages in the data page and the parity page configuring the parity group are all merely an example, and the present invention is not limited to the values described in the above embodiment.

Moreover, arbitrary multiplexing such as tripling and quadrupling, other than the duplexing, may be applied to the duplexed group. In this case, the duplexed group may be more generally referred to as a multiplexed group.

Other Embodiments

The present invention has been described based on the above embodiments, but the present invention is, of course, not limited to the above embodiments, and the embodiment can be changed within a scope not deviating from the technical concept of the invention. Changes can be made as below.

(1) In the access device 2, the non-volatile storage device 1, the memory controller 11, and the non-volatile storage system 1000 of the embodiment described above, each function block may be individually formed to one chip by a semiconductor device such as an LSI, or may be formed to one chip so as to include part of or all of the function blocks.

In the above description, the LSI has been provided by way of example, but the function block may be formed to a chip by a semiconductor device such as IC (Integrated Circuit), system LSI, super LSI, ultra LSI, or the like due to the difference in degree of integration.

Moreover, the method of forming an integrated circuit is not limited to the LSI, and an integrated circuit may be realized with a dedicated circuit or a general-purpose processor. Furthermore, an FPGA (Field Programmable Gate Array) capable of being programmed after the LSI manufacturing, or a reconfigurable processor capable of reconfiguring the connection and the setting of the circuit cells in the LSI may be used.

Further, if a technique of forming an integrated circuit that replaces the LSI appears according to a different technique advanced or derived from the semiconductor technique, the integration of the function blocks may, of course, be carried out using such a technique. For example, biotechnology or the like may be applied.

(2) Each process in the embodiment described above may be implemented by hardware, or may be implemented by software (including cases of being realized with OS (operating system), middleware, or predetermined library). Furthermore, each process may be realized by a mixed process of software and hardware. It should be recognized that the timing adjustment for carrying out each process needs to be carried out when implementing the access device 2, the non-volatile storage device 1, and the non-volatile storage system 1000 according to the above-described embodiment by hardware. In the above-described embodiment, the details of the timing adjustment of various types of signals generated in the actual hardware design is omitted for the sake of convenience of explanation.

Moreover, the executing order of the processing method in the embodiment described above is not necessarily limited to the described content of the embodiment described above, and the executing order can be interchanged within a scope not deviating from the technical scope of the present invention.

(3) The non-volatile storage device 1 according to the embodiment has been described as a detachable storage device like a semiconductor memory card, but may be realized as an information storage module of a type that can be incorporated in a substrate of the access device 2.

(4) In order to improve the write speed in a specific region of the first data recording region 125 (e.g., region where access device 2 stores management information of file system such as FAT) and the second data recording region 126 (mainly region where information of file entry is stored), the non-volatile storage device 1 according to the embodiment described above may have the arrangement of the data and the first and second error correcting codes with respect to such regions as below.

In a configuration using a flash memory of multi-level cell (e.g., cell storing quadrature information per cell) for the non-volatile memory, the arrangement may be such that the information per cell is less than other regions (e.g., storing binary information per cell) in the specific region of the first data recording region 125 and the second data recording region 126. Accordingly, the specific region of the first data recording region 125 and the second data recording region 126 can be physically accessed at high speed, and the management information of the file system that is accessed frequently can be efficiently read and written.

The non-volatile storage device and the memory controller according to the present invention can efficiently carry out the writing of data of a small size while improving reliability of stored data by carrying out first and second error corrections. This is obviously useful in the semiconductor memory card, but also in a movie, digital still camera, portable telephone terminal and the like, which are information processing terminals incorporating the non-volatile memory, and can be used in the field related to semiconductor memories.

What is claimed is:

1. A non-volatile storage device, which communicates with an access device and carries out reading and/or writing of data in accordance with a command from the access device, the non-volatile storage device comprising:
a non-volatile memory for storing data; and
a memory controller for carrying out control of the non-volatile memory,
wherein the non-volatile memory includes a plurality of blocks, which are erase units, each block of the plurality of blocks including a plurality of pages, which are write units of data, and
wherein the memory controller:
arranges a first logical block in one region by combining first blocks of the plurality of blocks, and arranges a second logical block in a different region by combining second blocks of the plurality of blocks;
assigns a plurality of error correcting groups to the first logical block, each error correcting group of the plurality of error correcting groups being configured by a plurality of pages of the first blocks of the first logical block;
assigns data and assigns at least one of a first error correcting code and a second error correcting code with respect to the data to each error correcting group;
configures one error correcting group of the plurality of error correcting groups as a parity group, the parity group including (i) data pages, of the first blocks of the first logical block, each of which includes the data and the first error correcting code with respect to the data and (ii) a parity page of one first block of the first logical block that includes the second error correcting code;
assigns a plurality of multiplexed groups to the second logical block, each multiplexed group of the plurality of multiplexed groups being configured by a plurality of data pages, each data page, of the second blocks of the second logical block, including data and the first error correcting code with respect to the data, and each multiplexed group of the plurality of multiplexed groups including one data page and a copy of the one data page as a copied data page;
when a data size of write data is smaller than a predetermined size, generates one data page from the write data and writes the generated data page and a copy of the generated data page as the copied data page in one multiplexed group to the second logical block, and when the data size of the write data is greater than or equal to the predetermined size, generates data pages and one parity page of the generated data pages from the write data and writes the generated data pages and the one parity page of the generated data pages in one parity group to the first logical block; and
includes a valid data management table for managing which one of the first logical block and the second logical block stores valid data with respect to an identical logical address.

2. The non-volatile storage device according to claim 1, wherein a size of a logical address space configured by the second logical block is smaller than a size of a logical address space configured by the first logical block.

3. The non-volatile storage device according to claim 1, wherein a number of blocks configuring the first logical block is equal to a number of blocks configuring the second logical block.

4. The non-volatile storage device according to claim 1, wherein:
the non-volatile memory is a flash memory capable of storing information exceeding a binary for every cell; and
at least the writing to the second blocks configuring the second logical block stores only information up to the binary for every cell.

5. The non-volatile storage device according to claim 1, wherein the memory controller:
makes one determination to write data to the second logical block when a data size of the data is smaller than a predetermined size, or makes another determination to write data to the first logical block when the data size of the data is greater than or equal to the predetermined size when writing data; and
writes the data based on the one determination or the other determination.

6. The non-volatile storage device according to claim 1, wherein each multiplexed group of the plurality of multiplexed groups is assigned data pages, of only two blocks of the second blocks of the second logical block, that each includes the data and the first error correcting code with respect to the relevant data.

7. The non-volatile storage device according to claim 1, wherein each multiplexed group of the plurality of multiplexed groups is configured by a plurality of data pages of the second blocks of the second logical block, and each multiplexed group of the plurality of multiplexed groups includes one data page of one second block of the second blocks and the copy of the one data page as the copied data page of another second block of the second blocks.

8. A memory controller for carrying out control of a non-volatile memory for storing data,
wherein the non-volatile memory includes a plurality of blocks, which are erase units, each block of the plurality of blocks including a plurality of pages, which are write units of data, and
wherein the memory controller:
arranges a first logical block in one region by combining first blocks of the plurality of blocks, and arranges a second logical block in a different region by combining second blocks of the plurality of blocks;
assigns a plurality of error correcting groups to the first logical block, each error correcting group of the plurality of error correcting groups being configured by a plurality of pages of the first blocks of the first logical block;
assigns data and assigns at least one of a first error correcting code and second error correcting code with respect to the data to each error correcting group;
configures one error correcting group of the plurality of error correcting groups as a parity group, the parity group including (i) data pages, of the first blocks of the first logical block, each of which includes the data and the first error correcting code with respect to the data and (ii) a parity page of one first block of the first logical block that includes the second error correcting code;
assigns a plurality of multiplexed groups to the second logical block, each multiplexed group of the plurality of multiplexed groups being configured by a plurality of data pages, each data page, of the second blocks of the second logical block, including data and the first error correcting code with respect to the data, and each multiplexed group of the plurality of multiplexed groups including one data page and a copy of the one data page as a copied data page;
when a data size of write data is smaller than a predetermined size, generates one data page from the write data and writes the generated data page and a copy of the generated data page as the copied data page in one multiplexed group to the second logical block, and when the data size of the write data is greater than or equal to the predetermined size, generates data pages and one parity page of the generated data page from the write data and writes the generated data pages and the one parity page of the generated data pages in one parity group to the first logical block; and
includes a valid data management table for managing which one of the first logical block and the second logical block stores valid data with respect to an identical logical address.

9. The memory controller according to claim 8, wherein a size of a logical address space configured by the second logical block is smaller than a size of a logical address space configured by the first logical block.

10. The memory controller according to claim 8, wherein a number of blocks configuring the first logical block is equal to a number of blocks configuring the second logical block.

11. The memory controller according to claim 8, wherein:
the non-volatile memory is a flash memory that stores information exceeding a binary for every cell; and
at least the writing to the second blocks configuring the second logical block stores only information up to the binary for every cell.

12. The memory controller according to claim 8, wherein the memory controller:
makes one determination to write data to the second logical block when a data size of the data is smaller than a predetermined size, or makes another determination to write data to the first logical block when the data size of the data is greater than or equal to the predetermined size when writing data; and
writes the data based on the one determination or the other determination.

13. The memory controller according to claim 8, wherein each multiplexed group of the plurality of multiplexed groups is assigned data pages, of only two blocks of the second blocks of the second logical block, that each includes the data and the first error correcting code with respect to the relevant data.

14. The memory controller according to claim 8, wherein each multiplexed group of the plurality of multiplexed groups is configured by a plurality of data pages of the second blocks of the second logical block, and each multiplexed group of the plurality of multiplexed groups includes one data page of one second block of the second blocks and the copy of the one data page as the copied data page of another second block of the second blocks.

* * * * *